(12) United States Patent
Lee et al.

(10) Patent No.: US 8,718,556 B2
(45) Date of Patent: May 6, 2014

(54) MOBILE TERMINAL AND CONTROLLING METHOD THEREOF

(75) Inventors: Donghoon Lee, Seoul (KR); Changhyun Han, Seoul (KR); Sunwoo Lee, Incheon (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 13/050,824

(22) Filed: Mar. 17, 2011

(65) Prior Publication Data

US 2011/0275391 A1 Nov. 10, 2011

(30) Foreign Application Priority Data

May 7, 2010 (KR) .......................... 10-2010-0042785

(51) Int. Cl.
*H04B 7/00* (2006.01)
*H04W 16/20* (2009.01)

(52) U.S. Cl.
CPC .................................... *H04W 16/20* (2013.01)
USPC ..... 455/41.2; 455/41.1; 455/41.3; 455/550.1; 455/566; 455/556.2; 715/761; 715/762; 715/763; 715/764; 715/778

(58) Field of Classification Search
USPC ............... 455/550.1, 566, 556.1, 556.2, 557, 455/41.1–41.3; 715/761–767, 778, 863, 715/864
See application file for complete search history.

(56) References Cited

U.S. PATENT DOCUMENTS

2011/0209103 A1* 8/2011 Hinckley et al. .............. 715/863
2011/0209104 A1* 8/2011 Hinckley et al. .............. 715/863

FOREIGN PATENT DOCUMENTS

| CN | 101115255 | 1/2008 |
| EP | 2073514 | 6/2009 |
| WO | 2009/143294 | 11/2009 |

OTHER PUBLICATIONS

The State Intellectual Property Office of the People's Republic of China Application Serial No. 201110113746.X, Office Action dated Sep. 22, 2013, 5 pages.

* cited by examiner

*Primary Examiner* — Fayyaz Alam
(74) *Attorney, Agent, or Firm* — Lee, Hong, Degerman, Kang & Waimey

(57) ABSTRACT

A mobile terminal includes a display, a user input unit configured to receive a user command, and a wireless communication unit configured to wirelessly communicate with a first entity over a first communication path and to wirelessly communicate with any of a plurality of external devices, each comprising a display, over a second communication path. The first communication path typically utilizes a different communication protocol than the second communication path. The mobile terminal also includes a controller configured to execute a first application, detect an event relating to a second application, and responsive to the detecting of the event, automatically search for external devices, which are among the plurality of external devices, that are available for communication with the mobile terminal over the second communication path.

14 Claims, 9 Drawing Sheets

FIG. 4
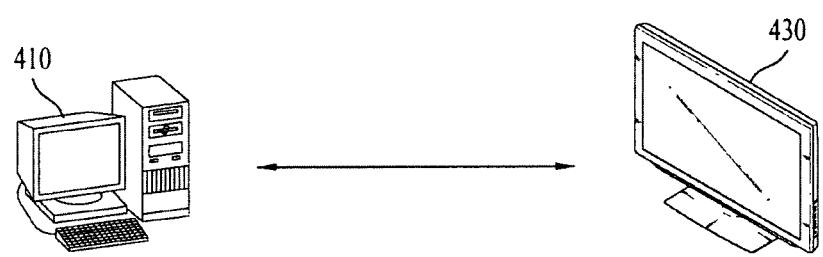
(a)
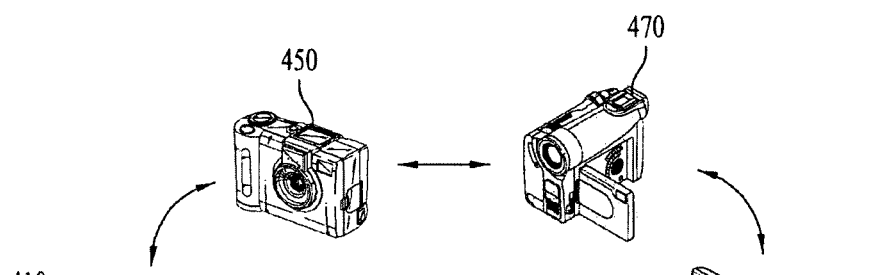
(b)

FIG. 6
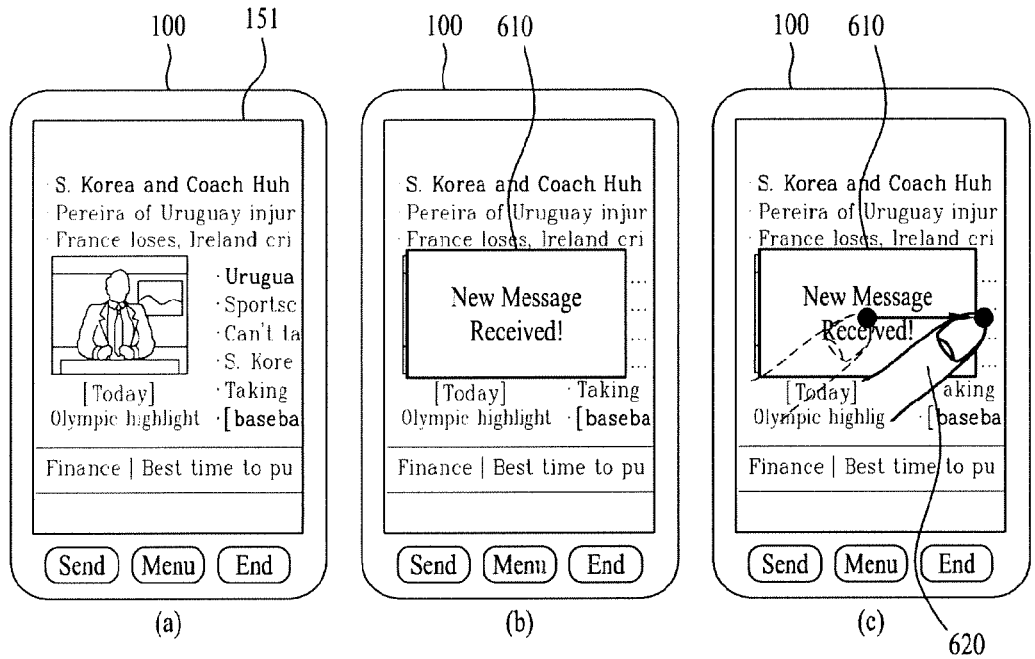
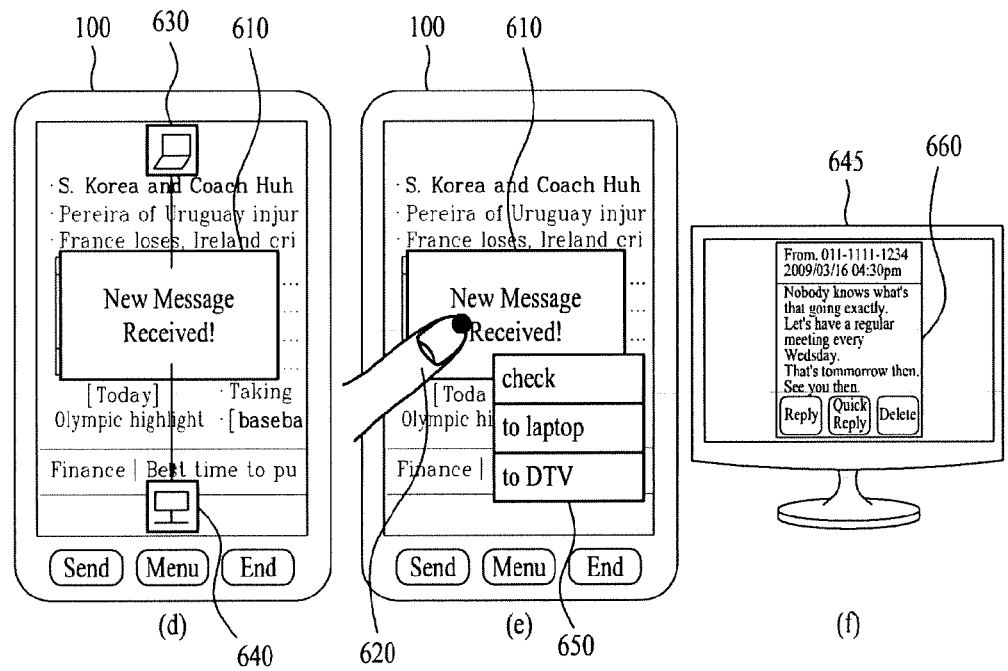

FIG. 8
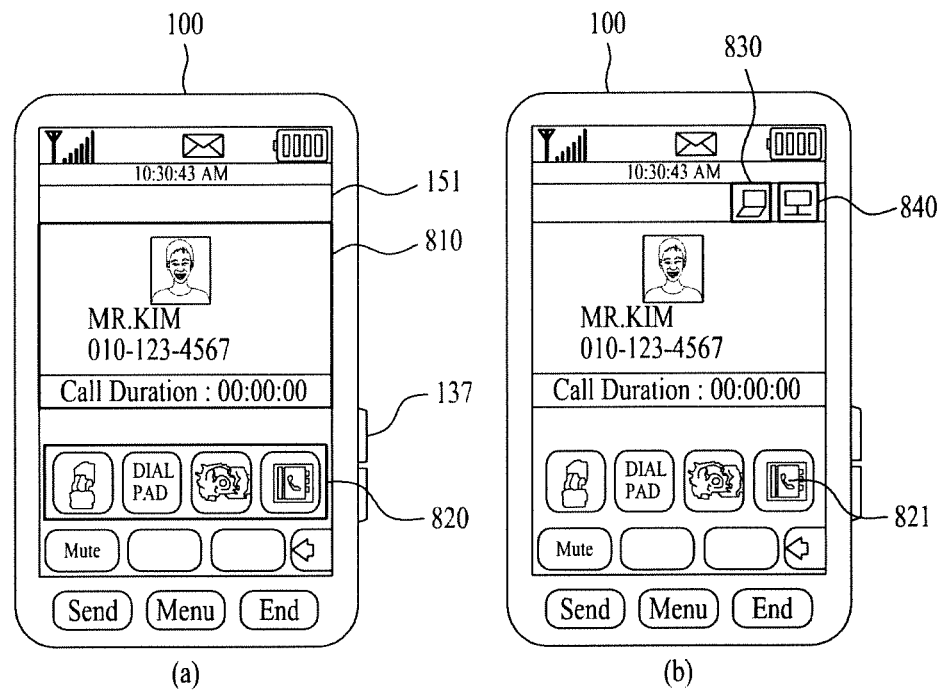
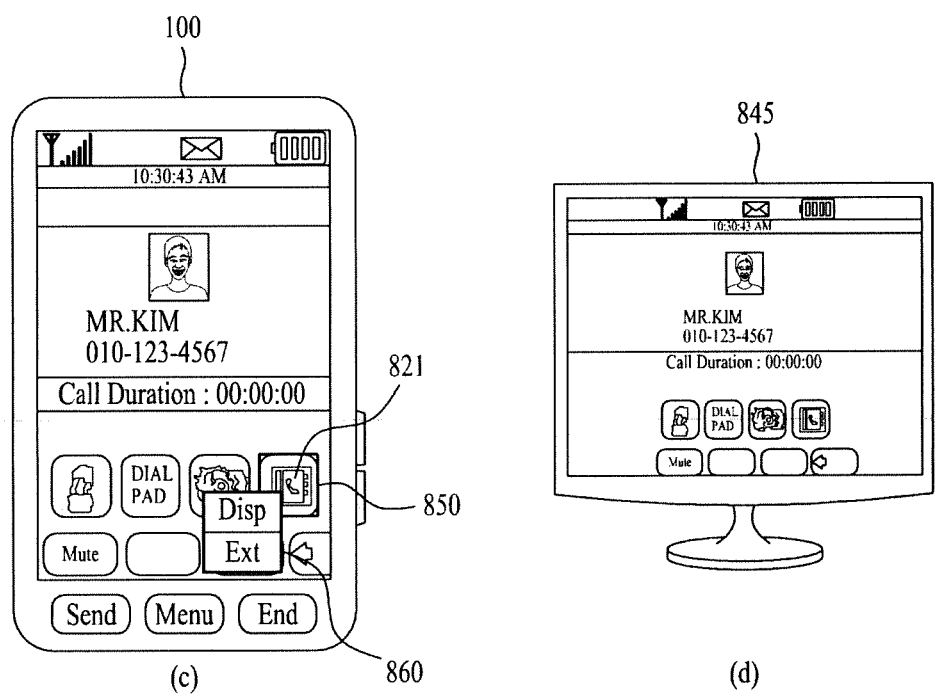

FIG. 9
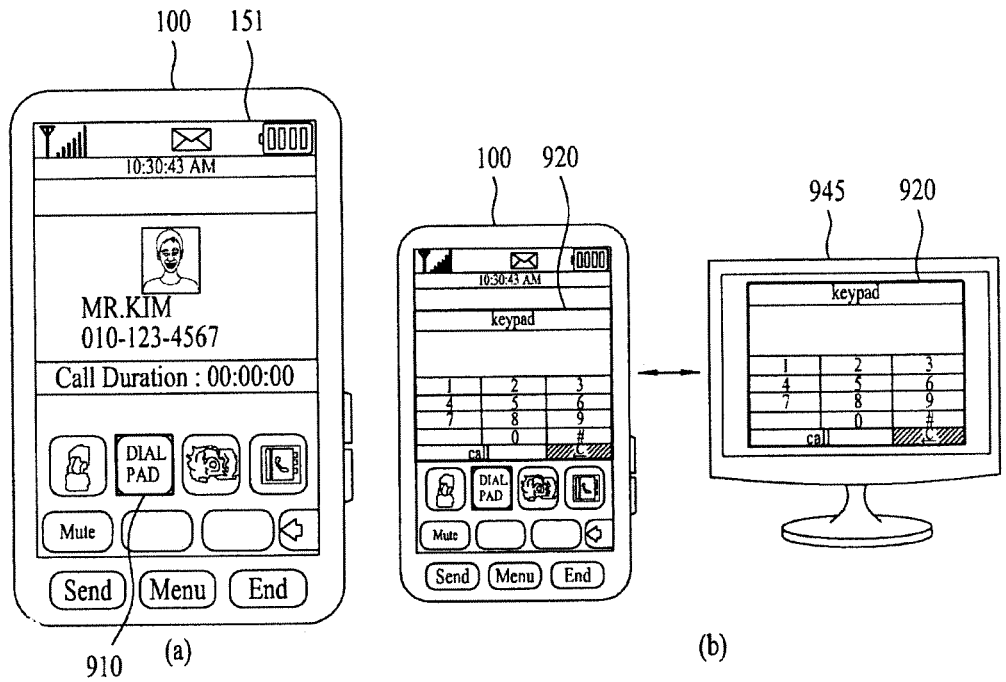
(a)
(b)
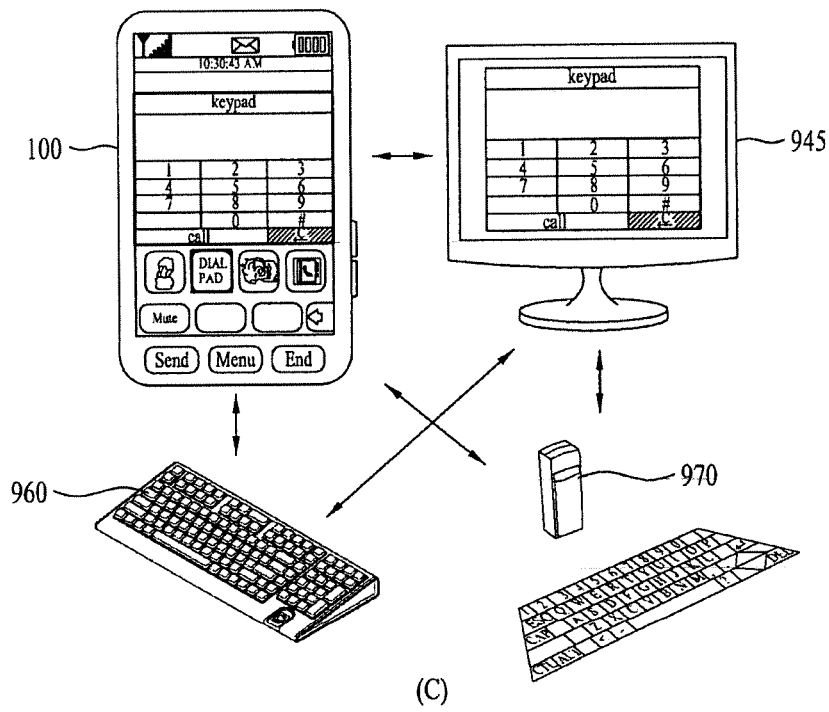
(C)

US 8,718,556 B2

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2010-0042785, filed on May 7, 2010, the contents of which are hereby incorporated by reference herein in their entirety.

FIELD OF THE INVENTION

The present invention relates generally to a mobile terminal, and more particularly, to a mobile terminal and controlling method thereof.

DISCUSSION OF THE RELATED ART

Generally, terminals can be classified into mobile/portable terminals and stationary terminals. The mobile terminals can be classified into handheld terminals and vehicle mount terminals again according to possibility of user's direct portability. As functions of the terminal are diversified, the terminal is implemented as a multimedia player provided with composite functions such as photographing of photos or moving pictures, playback of music or moving picture files, game play, broadcast reception and the like for example. To support and increase terminal functions, various improvement may be made to the structural parts and/or software parts of the terminal. Recently, electronic appliances capable of exchanging information by being connected to each other are ongoing to be developed and the standardizations for those electronic appliances are ongoing to be established as well. Therefore, the demand of an efficient and convenient method of displaying an image in a mobile terminal via an external image display device is rising.

SUMMARY

In accordance with an embodiment, a mobile terminal includes a display, a user input unit configured to receive a user command, and a wireless communication unit configured to wirelessly communicate with a first entity over a first communication path and to wirelessly communicate with any of a plurality of external devices, each comprising a display, over a second communication path. The first communication path typically utilizes a different communication protocol than the second communication path. The mobile terminal also includes a controller configured to execute a first application, detect an event relating to a second application, and responsive to the detecting of the event, automatically search for external devices, which are among the plurality of external devices, that are available for communication with the mobile terminal over the second communication path.

In accordance with another embodiment, the just-mentioned controller of the mobile terminal may alternatively or additionally be configured to execute an application at the mobile terminal, cause displaying on the display a user interface which permits user control of features of the application, automatically search for external devices, which are among the plurality of external devices, that are available for communication with the mobile terminal over the second communication path, establish communication with a selected external device, which is one of the external devices, and after the communication is established with the selected external device, cause communication of data to the selected external device to permit displaying on an associated display of the selected external device, wherein the communication of the data is over the second communication path and the data relates to the user interface of the application.

In accordance with yet another embodiment, the just-mentioned controllers of the mobile terminal may alternatively or additionally be configured to cause displaying on the display a user interface which permits user input to the mobile terminal, search for external devices, which are among the plurality of external devices, that are available for communication with the mobile terminal over the second communication path, establish communication with a selected external device, which is an external device identified in the search, after the communication is established with the selected external device, cause communication of data to the selected external device to permit displaying of a user interface, which is a representation of at least a portion of the user interface of the mobile terminal, on an associated display of the selected external device. In this example, the communication of the data is over the second communication path and the data relates to the user interface of the mobile terminal. The controller may also receive input data via the wireless communication unit over the second communication path, the input data being generated responsive to user interaction with the user interface displayed on the display of the selected external device.

In accordance with still another embodiment, a method includes wirelessly communicating with a first entity over a first communication path, wirelessly communicating with any of a plurality of external devices, each comprising a display, over a second communication path, wherein the first communication path utilizes a different communication protocol than the second communication path, executing a first application at a mobile terminal, detecting an event occurring at the mobile terminal, the event relating to a second application, and responsive to the detecting of the event, automatically searching for external devices, which are among the plurality of external devices, that are available for communication with the mobile terminal over the second communication path.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 4(a) and 4(b) depict a network environment in which a mobile terminal functions with regard to other devices.

FIGS. 6(a) through 6(f) depict a series of display screen configurations for displaying a second application on an external display device in accordance with a communication event occurring in a mobile terminal according to assorted embodiments of the present invention.

FIGS. 8(a) through 8(d) depict various display screen configurations for displaying a second application on an external display device in accordance with a communication event occurring in a mobile terminal according to various embodiments of the present invention.

FIGS. 9(a)-9(c) are diagrams of display screen configurations for another example of displaying a second application on an external display device in accordance with a communication event occurring in a mobile terminal according to another embodiment of the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
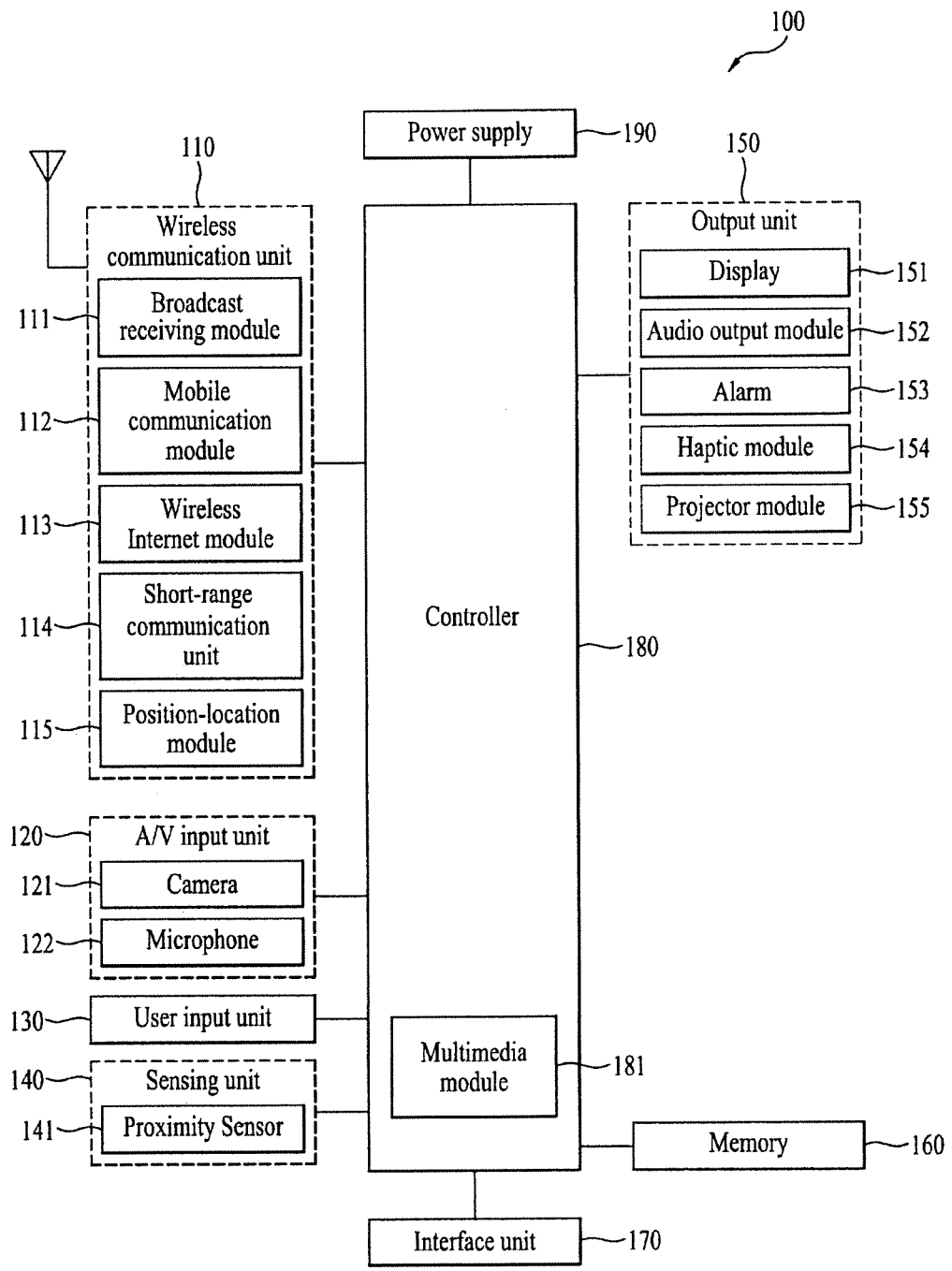
FIG. 1 is a block diagram of a mobile terminal 100 in accordance with an embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
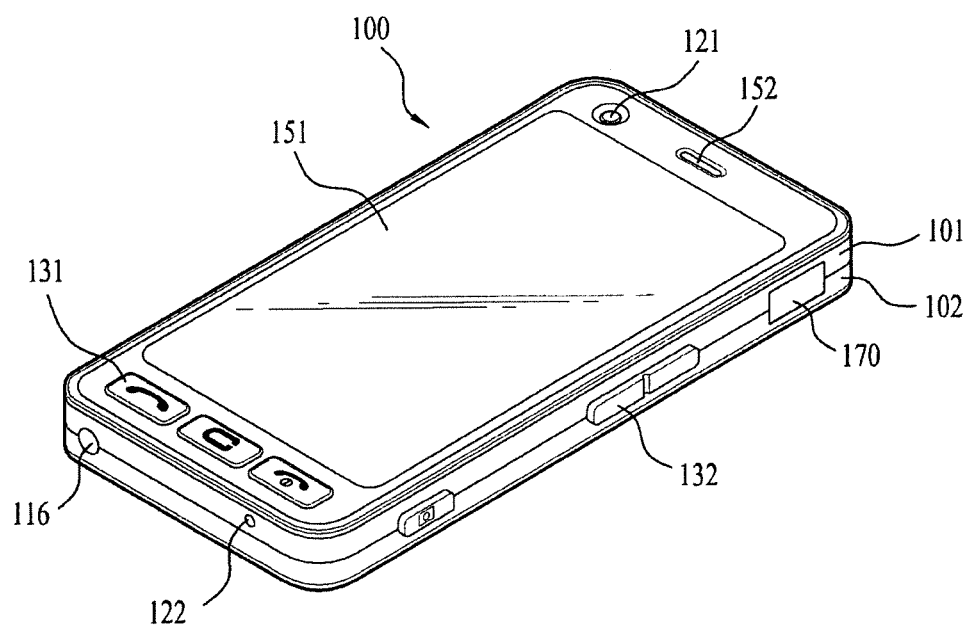
FIG. 2 is a front perspective diagram of a mobile terminal according to various embodiments of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
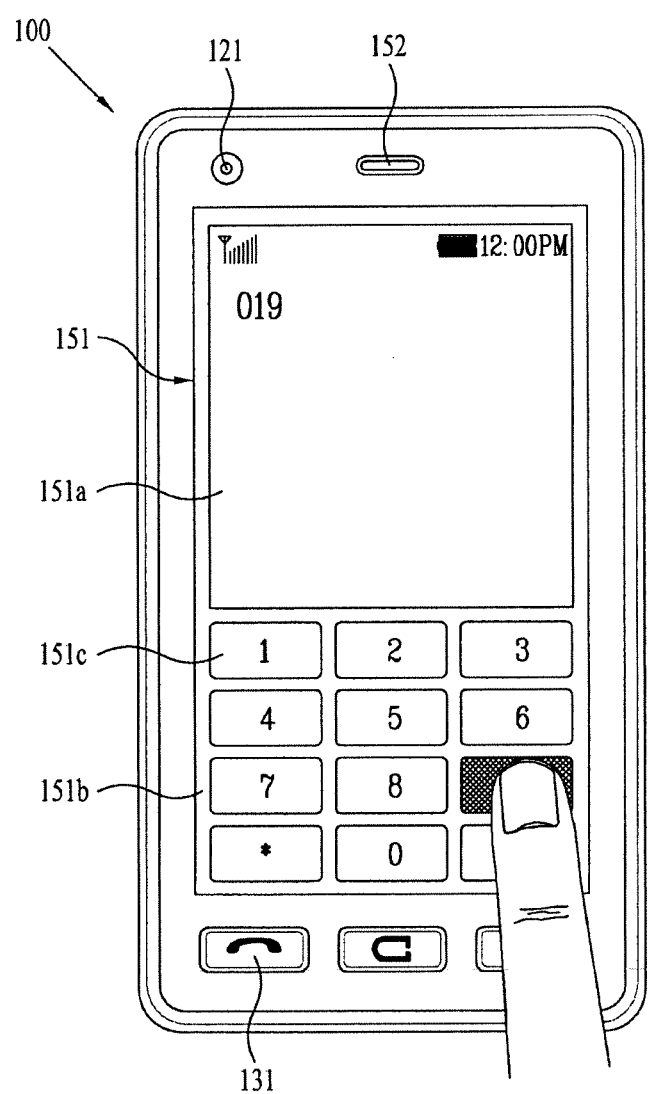
FIG. 3 is a front-view of terminal 100 according to various embodiment s of the present invention.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is inputted through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1. In addition, a graphic for pointing at a specific object on a display unit or selecting a menu from the display unit as an arrow, a finger and the like is called a pointer or a cursor. The term "pointer" is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like will often be referred to as a pointer.

In general, an application is implemented as software separately installed and/or executed. An application described herein indicates all targets that visually display information on a prescribed region when a specific function is executed. The controller 180 of the mobile terminal may be configured to control at least two applications simultaneously. In doing so, the executed applications are displayed on partitioned screens of the display unit 151, respectively. Alternatively, one of the executed applications is displayed on a whole screen of the display unit 151. As another alternative, one of the executed applications is displayed in a manner of blocking at least one portion of a region related to the other executed application. Moreover, consider that the controller 180 of the mobile terminal 100 may also perform a multitasking function of executing and controlling the above-mentioned at least two applications simultaneously.

Recently, the rapidly developed performance of a processor (e.g., controller 180) of a mobile terminal enables advanced operations. Moreover, the performance enhancement of the wireless communication unit 110 enables high-speed data communications via various radio interfaces. Accordingly, data, and more particularly, displayed video/contents can be shared between mobile terminals or digital appliances having different display devices. Of course, the data sharing between the appliances or devices can be performed by wire systems as well as wireless systems.

Compatible technologies for contents exchange between digital devices are internationally ongoing to be standardized. For examples, DLNA (digital living network alliance) participates in the standardization. The DLNA standard proposes various conditions and methods for the mutual data exchanges among various kinds of digital devices. A connecting method, specifications and the like in the embodiments of the presence invention can be supplemented by the DLNA standard documents. Moreover, various features disclosed herein may be performed via various kinds of communication interfaces (e.g., Wi-Fi, Bluetooth, IEEE1394, USB, infrared communication, etc.). In order to deliver content to a renderer from a server, a source of the content is intactly delivered and then reproduced, a screen shot of a still cut is transmitted by sampling a video of a displayed content by specific periodicity, or a real-time video streaming in a prescribed frame can be used. In addition, after a separate sharing application for contents sharing has been installed each of the server and the renderer, data exchange can be performed according to the type defined in the sharing application.

FIGS. 4(*a*) and 4(*b*) depict a network environment in which a mobile terminal functions with regard to other devices. In FIG. 4 (*a*), a terminal 100 is connected to a computer 410 and a television 430 by wire/wireless to perform contents/data exchanges with the connected computer or television. In this case, contents sharing can be performed in a following manner.

First, one device serves a role as a content server configured to supply content to the other device and the other device serves as a renderer configured to receive and display the corresponding content. Alternatively, one device serves as a controller configured to control a device serving as a content server and the other performs a content display function only. For instance, if the computer 410 becomes a content server, the mobile terminal 100 controls the computer 410 to enable a specific content in the computer 410 to be displayed on the television 430. In addition, the inter-device connection procedures presented in more detail below can be configured in a manner that a content server also performs a control function and that a renderer responsible for a display of content performs the control function together.

In FIG. 4(*b*), the above-described inter-device connection can be configured in a manner of further including a digital camera 450 and a digital camcorder 470.

Various embodiments will now be described involving the sharing of content and an application execution screen of a mobile terminal via connections among digital devices including the mobile terminal. According to one embodiment, a method of displaying at least one portion of applications executed in a mobile terminal on an external device (referred to also as external display device) is provided. In this arrangement, the external display device includes all devices capable of displaying prescribed data via its display in a manner of being connected to the mobile terminal 100 via a mechanism or method of data sharing between digital devices including the aforesaid DLNA.

Figure 5:
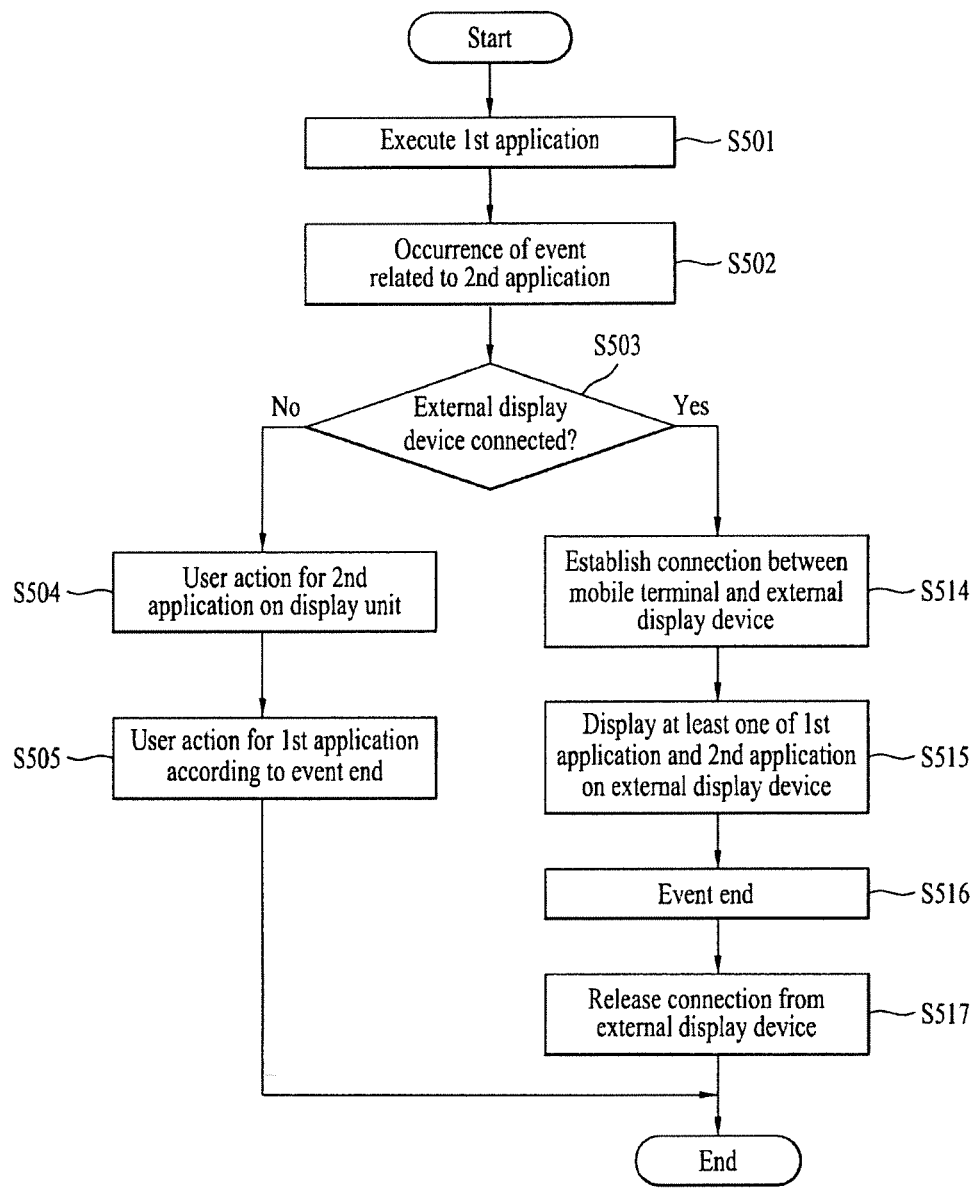
FIG. 5 is a flowchart depicting a method for sharing an application executed screen using an external display device according to one embodiment of the present invention.

FIG. 5 is a flowchart depicting a method for sharing an application executed screen using an external display device according to one embodiment of the present invention. In FIG. 5, a user is able to execute a random application by a prescribed menu manipulation via the user input unit 130 (S501). If a specific condition is met instead of a user's menu manipulation or an event occurs (e.g., such communication event can be a call, a message arrival and the like or a preset advent of a specific timing point), a first application can be executed.

In block S502, an event related to a second application may occur. If the event related to the second application occurs, the second application can be automatically executed. Alternatively, when a prescribed visual effect indicating an occurrence of the corresponding event is generated, if a user inputs an additional command for the event while the corresponding visual effect is valid, the second application can be executed.

For example, the event can include a time indication event for a preset alarm time, an anniversary, a schedule or the like, a communication event including a text message, an email, a multi-mail, a voice call, a video call or the like. The second application can include an application executed for multitasking according to a user's menu selection as well as the application related to the event occurrence.

Subsequently, the user is able to make a selection of a connection to an external display device (S503). In this case, the connection to the external display device is configured in a manner that the controller 180 automatically selects the external display device according to a preset or defined priority. Alternatively, after connectible external display devices have been displayed or identified, a user is able to select one of the connectible external display devices. The selection of the external display device can be set in advance by the user according to the corresponding second application. In this case, the setting information can be stored in the memory 160.

If the user does not make the selection of the external display device or the second application does not support a function of connection to the external display device, the second application can be displayed on the display unit 151 of the mobile terminal only. The user is able to take an action appropriate for the situation (S504). In the case that the corresponding event ends, the second application is terminated and the user is then able to manipulate the first application again (S505).

Returning to step S503, if the user selects the connection to the external display device or the connection to the external display device is performed according to the decision made by the controller 180, the controller 180 performs the connection to the external display device according to the setting (e.g., a priority per external display device according to a type of the second application) or a user's selection (S514).

If the connection between the mobile terminal 100 and the external display device is established (i.e., data path/connection established), at least one of the first and second applications can be displayed on the external display device (S515). In this case, which one of the applications will be displayed on the external display device can be determined according to a user's command input via the user input unit 130 or a setting value previously set dependent on a type of the second application.

The application executed screen sharing via the external display device is terminated according to the end of the event or a second application (S516), and the connection to the corresponding external display device can be then released (S517).

In the following description, a method of sharing an application executed screen using an external display device is described in more detail.

FIGS. 6(*a*) through 6(*f*) depict a series of display screen configurations for displaying a second application on an external display device in accordance with a communication event occurring in a mobile terminal according to assorted embodiments of the present invention. Referring to FIG. 6 (*a*), a web browser is executed as a first application on the display unit 151 of the mobile terminal 100. If a text message is received, a message window 610 indicating the reception of the text message can be displayed on the display unit 151 (FIG. 6 (*b*)).

In this case, a second application may relate to the text message. Thus, a user is able to perform a prescribed menu input to check the text message on an external display device. When the display unit 151 includes a touchscreen configured to recognize a user's touch input, the user is able to execute an external display device connecting function by inputting a drag input using a pointer (e.g., finger) 620 in one direction (FIG. 6 (*c*)). In doing so, if an external display device allocated to the text message check function is set in advance or there is one connectible external display device only, the connection to the corresponding external display device can be directly performed.

Consider the scenario in which a connection to a plurality of external display devices is available, such as that shown in FIG. 6 (*d*), icons of connectible external display devices can be displayed on various location of the display unit (e.g., top, bottom, etc.). If the user intends to check the text message via a laptop, the user is able to select the laptop as the external display device for the text message check by inputting a drag touch toward the icon 630 corresponding to the laptop (i.e., top direction) or selecting the corresponding icon 630. If the user intends to check the text message via a TV, the user is able to select the TV as the external display device for the text message check by inputting a drag touch toward the icon 640 corresponding to the TV (i.e., bottom direction) or selecting the corresponding icon 640. In this case, the icon can be replaced by a text or another visual effect. In addition, arranged location of the icon can be randomly changed.

Menu manipulation may alternatively or additionally be used for sharing via the external display device. For instance, referring to FIG. 6 (*e*), while a message reception indicating window 610 is valid or is presented, if a user selects the message reception indicating window 610 using a pointer 620, a menu window 650 related to a received text message check can be displayed in the vicinity of the message reception indicating window 610 or at a preset position. In this case, a function of directly checking a received message, a shortcut to a selectable external display device and the like can be included in the menu window 650.

If a TV is selected as the external display device by one or more of the above described methods shown in FIGS. 6 (*c*) to 6 (*e*), content 660 of the text message can be displayed on the external device, which is shown as TV 645 (FIG. 6 (*f*)). In this case, a web browser is displayed on the display unit of the mobile terminal according to a user selection or setting or can be displayed together with the content of the text message.

If the second application and the first application are set to be displayed on the external display device and the display unit 151 of the mobile terminal 100, respectively, it may be useful for the user to keep viewing the first application by avoiding the influence of the second application according to the event occurrence.

Moreover, if at least two or more applications including the first and second applications are not always executed according to the above embodiment but only one application is executed, at least one portion of the executed screen of the corresponding application can be displayed on the external display device. In this case, a function of sharing the executed screen with the external display device can be executed by selecting a specific button (e.g., a hardware key button, a virtual key button on a touchscreen, etc.). This function is useful if it is difficult to check the display unit 151 of the mobile terminal 100 according to the user's execution of the corresponding application such as a voice call function and the like.

In some implementations of the embodiment of FIGS. 5 and 6(*a*)-6(*f*), a wireless communication unit of the mobile terminal may be configured to wirelessly communicate with a first entity over a first communication path and to wirelessly communicate with any of a plurality of external devices (e.g., device 645), where each external devices includes a display, and over a second communication path. In some instances, the first communication path utilizes a different communication protocol than the second communication path. The controller may be configured to execute a first application at the mobile terminal, detect an event relating to a second application, and responsive to the detecting of the event, automatically search for external devices that are available for communication with the mobile terminal over the second communication path.

Still further embodiments relate to storing modified content in situations in which information for a shared application is modified in the course of sharing the application execution screen using an external display device. One example of this feature will now be described.

Figure 7:
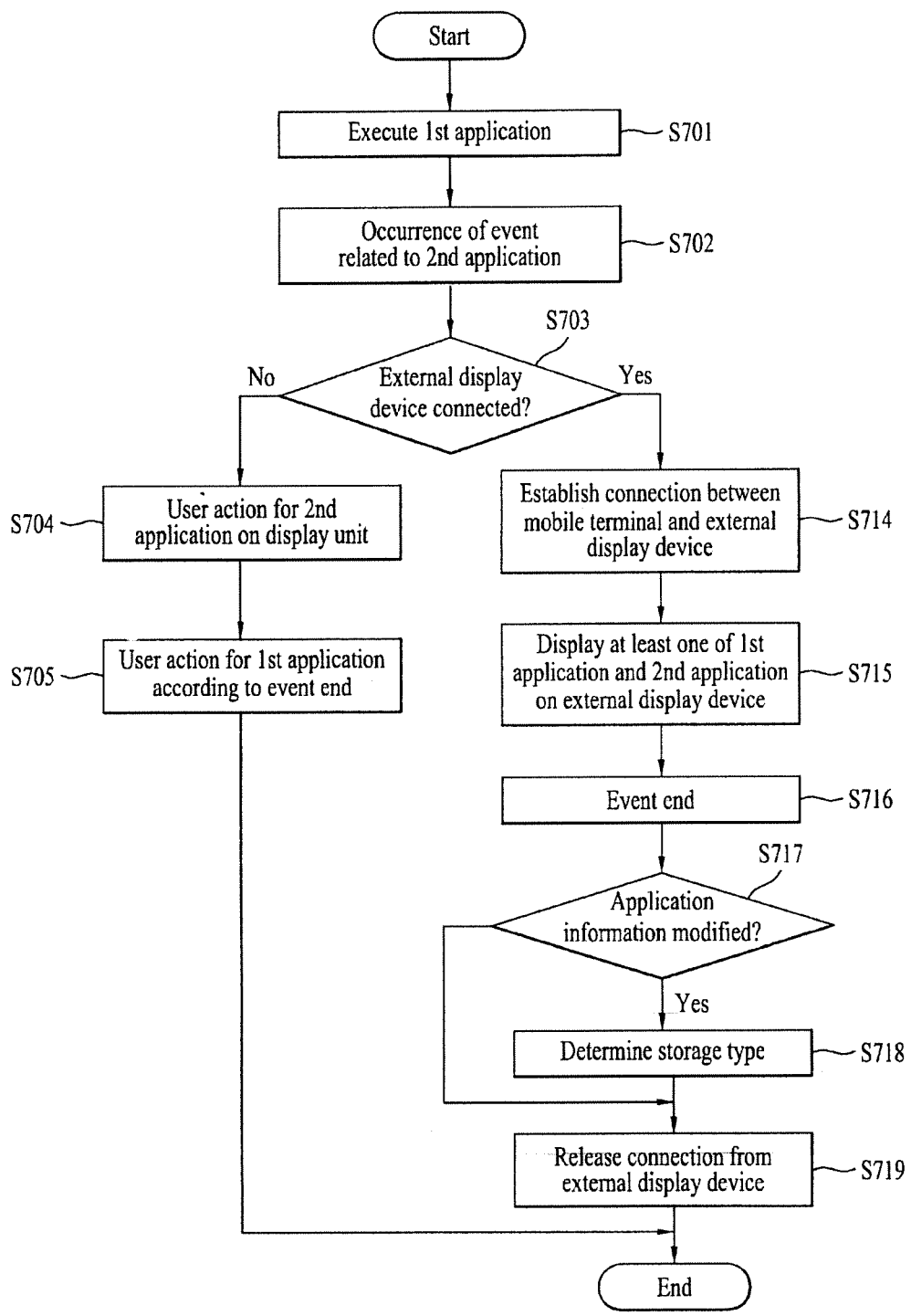
FIG. 7 is a flowchart depicting a method of sharing an application executed screen using an external display device according to some embodiments of the present invention.

FIG. 7 is a flowchart depicting a method of sharing an application executed screen using an external display device according to some embodiments of the present invention. Note that the functions associated with blocks S701 to S705 and S714 to S716 in FIG. 7 may be implemented in a manner that is the same or similar to blocks S501 to S505 and blocks S514 to S516 in FIG. 5, respectively. Since these features were previously described, description of these features has been omitted with regard to the embodiment of FIG. 7.

Referring still to FIG. 7, according to the termination of an event or a second application, an application executed screen sharing with an external display device can be terminated (S716). In addition, information on an application displayed via the external display device can be searched, modified, corrected, and the like by an input via the user input unit 130 of the mobile terminal 100, for example. Moreover, in the connection between the mobile terminal and the external display device, if the bidirectional connection is established to enable the external display device to perform a controller function, the information on the corresponding application can be modified or corrected via a user input unit provided to the external display device.

When external display device includes a storage device, the information on the application can be stored in the external display device according to a user selection (S718). After the storage of the modified application information has been completed, the connection between the mobile terminal 100 and the external display device can be released (S719).

In the above-described application executed screen sharing method using the external display device, as one of methods for modifying/correcting data of an application via the external display device, a user may be enabled to use a remote user interface (RUI) according to the DLNA standard. In this example, the remote user interface includes a user interface provided by a server device to be executed in a client device and defines how user interface content is described, formatted and transmitted to another device. In addition, the remote user interface includes a mechanism for updating a modified item generated via the remote user interface among devices. Various features of FIG. 7 will now be described with regard to the screen sharing method show in FIG. 8.

FIGS. 8(*a*) through 8(*d*) depict various display screen configurations for displaying a second application on an external display device in accordance with a communication event occurring in a mobile terminal according to various embodiments of the present invention. In FIG. 8 (*a*), if a voice call function is executed in the mobile terminal 100, icons 820 of applications executable during a call are displayed on defined region of the display unit 151. If a user manipulates a specific key button 137, for example, an image currently displayed on the display unit 151 can be transmitted to an external display device. In addition, the specific key button 137 can be replaced by another command input devices and techniques. For instance, if the display unit 151 includes a touchscreen, a virtual key button may be used to perform the same function as the specific key if manipulated, or a shaking in a specific pattern may be detected by sensing unit 140 for sensing a shaking/acceleration of the mobile terminal 100, an image currently displayed on the display unit 151 can be transmitted to an external display device. Regardless of the technique utilized, referring now to FIG. 8 (*d*), the image displayed on the display unit 151 can then be displayed.

When the first application is a call function, such as shown in FIG. 8 (*b*), the connectible external display devices can be displayed as prescribed icons 830 and 840 on a prescribed or otherwise defined region of the display unit 151. To accomplish this, the controller 180 may search for connectible external display devices neighboring or otherwise within range of the mobile terminal 100. The controller may also store the results of this search in memory. In this case, if a user intends to display a second application via an external display device, the corresponding application can be displayed on the specific external display device by manipulating a shortcut of the second application and a specific external display device icon together.

For instance, if a user intents to execute a phonebook function on a TV, the phonebook function can be displayed on the TV by dragging the shortcut icon 821 of the phonebook function to the icon 840 corresponding to the TV. If display unit 151 supports a multi-touch for recognizing at least two touch points, the same function can be executed in a manner of touching the application icon shortcut icon and the icon corresponding to the external display device simultaneously. Moreover, the same function can be executed by selecting the corresponding icons in order of 'application→external display device→or external display device→application.

Referring next to FIG. 8 (*c*), if a user selects the phonebook icon 821, a prescribed visual effect 850 such as an outline is generated and a menu window 860 can be displayed in the vicinity of the prescribed visual effect 850. In this case, the user is able to make a selection to determine whether to execute the phonebook function on the display unit 151 or the external display device.

Such an application, of which information can be searched/modified/corrected, as a phonebook function is displayed on the external display device by one of the previously described methods, for example. If the information is modified, it may be determined which device will be used for storing the modified/corrected information according to a user selection or a preset setting value. For example, if a user adds a new number by editing a phonebook on the external display device using the remote user interface, the determination is made as to whether the information of the added number is to be stored in the mobile terminal, the external display device, or both of the mobile terminal and the external display device.

When data is received from the mobile terminal for displaying a phonebook on the external display device, a data type may include image data corresponding to an image of the phonebook displayed on the mobile terminal or data including values of fields (e.g., name field, phone number field, address field, etc.) included in the phonebook. If the external display device receives the field values only, a phonebook of a type different than that which is displayed on the mobile terminal can be displayed on the external display device by reconfiguring/rearranging the corresponding field values via a user interface for the external display device only. For instance, since the display unit of the external display device is normally greater than the display unit 151 of the mobile terminal 100, the type of the phonebook can be changed and displayed to display more information on one screen.

FIGS. 9(*a*)-9(*c*) are diagrams of display screen configurations for another example of displaying a second application on an external display device in accordance with a communication event occurring in a mobile terminal according to another embodiment of the present invention. In this example, display unit 151 includes a touchscreen or other similar device.

Referring to FIG. 9 (*a*), as a voice call function is executed in the mobile terminal 100, information on a call counterpart and icons of other applications executable in the course of a call are displayed on a prescribed region of the display unit 151. In this example, a user is able to page a virtual keypad function by selecting a virtual keypad icon 910 to perform a call memo.

If the virtual keypad function is executed on the touchscreen 151, the user normally places the mobile terminal in front of user's face instead of placing the mobile terminal between user's mouth and ear. Such a position of the mobile terminal often interrupts a smooth call. Therefore, to minimize or eliminate such effects, among other things, the virtual keypad may be displayed on the external display device while permitting the mobile terminal to be able to continue with the call function. In some instance, a user may input (to the mobile terminal) by way of receiving input via a virtual keypad.

The user is able to use one of the previously described methods (e.g., FIG. 8 (*b*) or (*c*)) to execute the virtual keypad function. An image displayed on the external display device can have the same image as displayed on the display unit 151 of the mobile terminal 100, or the external display device may only include portions of the newly executed application, and included interface, as shown in FIG. 9 (*b*).

In this arrangement, the user is able to modify/correct the information on the application displayed on the external display device via external input devices 960 and 970 connected to the mobile terminal 100 or the external display device 945 shown in FIG. 9 (*c*). If the external input device is connected to the external display device, the information modified via the external input device can be transmitted to the mobile terminal 100 by real time or on a periodic or other basis. Alternatively, the information modified via the external input device can be transmitted to the mobile terminal 100 each time an input is received.

For example, the external input devices may include a wireless keyboard 960 using a infrared communication function, a projection type virtual keyboard 970 using a light emitting device and a light-sensing device, and the like. A typical projection type virtual keyboard generates a virtual keyboard image on a plane using red laser diodes and simultaneously emits infrared rays. If the keyboard generated from the laser beam is pressed with a finger, the infrared ray overlaid on the keyboard is touched to be reflected. The reflected infrared ray is captured by such a light-sensing device as a CMOS image sensor to enable a position of the finger to be determined. In addition, the external input devices can include a remote controller for manipulating a TV, a general computer keyboard, a mouse and the like.

In the above described embodiments, the touch action via the pointer can be replaced by a command input using a cursor manipulated via a navigation key or a key button corresponding to the navigation key.

According to one embodiment of the present invention, the methods presented herein can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features. Each of the structural elements or features should be considered selectively unless specified separately. Each of the structural elements or features may be carried out without being combined with other structural elements or features. Also, some structural elements and/or features may be combined with one another to constitute the embodiments of the present invention.

Although embodiments may be implemented using the exemplary series of operations described herein (e.g., in conjunction with the various flowcharts discussed above), additional or fewer operations may be performed. Moreover, it is to be understood that the order of operations shown and described is merely exemplary and that no single order of operation is required. Furthermore, the foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal, comprising:
    a display;
    a user input unit configured to receive a user command;
    a wireless communication unit configured to wirelessly communicate with a first entity over a first communication path and to wirelessly communicate with any of a plurality of external devices, each comprising a display, over a second communication path, wherein the first communication path utilizes a different communication protocol than the second communication path; and
    a controller configured to:
        execute a first application at the mobile terminal;
        detect an event relating to a second application, the event being a time indication event or a communication event;
        responsive to the detecting of the event, automatically searching for external devices, which are among the plurality of external devices, that are available for communication with the mobile terminal over the second communication path;
        establish communication with a specific external device of the searched external devices; and
        after the communication is established with the specific external device, cause communication of data to the specific external device for displaying on an associated display of the specific external device, wherein the communication of the data is over the second communication path and the data relates to the detected event.

2. The mobile terminal of claim 1, wherein the controller is further configured to:
    cause displaying of a plurality of icons on the display according to results from the searching, wherein each icon of the plurality of icons identifies a particular external device that is available for the communication with the mobile terminal; and
    automatically release the second communication path to the specific external device responsive to a conclusion of the event, and
    wherein the specific external device is selected responsive to dragging user input received at the display, wherein a direction of the dragging user input towards a particular one of the plurality of icons determines which of the searched external devices is the specific external device.

3. The mobile terminal of claim 1, wherein the controller is further configured to:
    cause displaying of an indicator on the display according to results from the searching, the indicator identifying an external device or devices that are available for the communication with the mobile terminal; and
    automatically release the second communication path to the specific external device responsive to a conclusion of the event, and
    wherein the specific external device is selected responsive to user input.

4. The mobile terminal of claim 1, further comprising:
    a memory configured to store application data; and
    wherein if data utilized by the second application is modified, the controller is further configured to:
    selectively cause storing of the modified data at either or both of the memory of the mobile terminal and memory of the specific external device.

5. The mobile terminal of claim 4, wherein the modification of the data is performed responsive to user input to a device in communication to the specific external device.

6. The mobile terminal of claim 5, wherein the selectively storing of the modified data is performed responsive to user command to permit user selection of the memory of the mobile terminal, or the memory of the specific external device, or both, for the storing of the modified data.

7. The mobile terminal of claim 1, wherein the event is a receiving of a message over the first communication path.

8. The mobile terminal of claim 1, wherein the first application is different from the second application.

9. A method, comprising:
wirelessly communicating with a first entity over a first communication path;
wirelessly communicating with any of a plurality of external devices, each comprising a display, over a second communication path, wherein the first communication path utilizes a different communication protocol than the second communication path;
executing a first application at a mobile terminal;
detecting an event occurring at the mobile terminal, the event relating to a second application and the event being a time indication event or a communication event;
responsive to the detecting of the event, automatically searching for external devices, which are among the plurality of external devices, that are available for communication with the mobile terminal over the second communication path;
establishing communication with a specific external device of the searched external devices; and
after the communication is established with the specific external device, causing communication of data to the specific external device for displaying on an associated display of the specific external device, wherein the communication of the data is over the second communication path and the data relates to the detected event.

10. The method of claim 9, further comprising:
displaying a plurality of icons on a display of the mobile terminal according to results from the searching, wherein each icon of the plurality of icons identifies a particular external device that is available for the communication with the mobile terminal; and
automatically releasing the second communication path to the specific external device responsive to a conclusion of the event, and
wherein the specific external device is selected responsive to dragging user input received at the display, wherein a direction of the dragging user input towards a particular one of the plurality of icons determines which of the searched external devices is the specific external device.

11. The method of claim 9, further comprising:
displaying an indicator on the display of the mobile terminal according to results from the searching, the indicator identifying an external device or devices that are available for the communication with the mobile terminal; and
automatically releasing the second communication path to the specific external device responsive to a conclusion of the event, and
wherein the specific external device is selected responsive to user input.

12. The method of claim 9, wherein if data utilized by the second application is modified, the method further comprises:
selectively storing the modified data at memory of the mobile terminal, memory of the specific external device, or both the memory of the mobile terminal and the memory of the specific external device.

13. The method of claim 12, wherein the modification of the data is performed responsive to user input to a device in communication to the specific external device.

14. The method of claim 13, wherein the selectively storing of the modified data is performed responsive to user command to permit user selection of the memory of the mobile terminal, or the memory of the specific external device, or both, for the storing of the modified data.

* * * * *